United States Patent [19]

Choi

[11] Patent Number: 5,509,991
[45] Date of Patent: Apr. 23, 1996

[54] METHOD OF PRODUCING AN OPTICAL DISK HAVING AN INTEGRATED LABEL LAYER

[75] Inventor: Hwan-Moon Choi, Seoul, Rep. of Korea

[73] Assignee: Daewoo Electronics Co., Ltd., Seoul, Rep. of Korea

[21] Appl. No.: 299,180

[22] Filed: Aug. 31, 1994

[30] Foreign Application Priority Data

Aug. 31, 1993 [KR] Rep. of Korea ................... 1993-17210

[51] Int. Cl.$^6$ .................................................. B29D 17/00
[52] U.S. Cl. ......................... 156/245; 156/60; 264/106; 264/107; 264/132
[58] Field of Search ................................. 369/275.5, 282, 369/283, 286, 288, 292, 272, 273, 274; 264/106, 107, 132, 1.33, 328.1, 328.2; 156/60, 245; 428/694 SC, 694 DE, 694 RL, 908

[56] References Cited

U.S. PATENT DOCUMENTS

| | | | |
|---|---|---|---|
| 5,208,088 | 5/1993 | Tominaga et al. | 369/283 |
| 5,284,538 | 2/1994 | Suzuki et al. | 369/283 |
| 5,346,654 | 9/1994 | Kodaka et al. | 264/107 |

FOREIGN PATENT DOCUMENTS

| | | |
|---|---|---|
| 6-176403 | 6/1994 | Japan . |
| 90/04812 | 5/1990 | WIPO . |

*Primary Examiner*—Michael W. Ball
*Assistant Examiner*—Richard Crispino
*Attorney, Agent, or Firm*—Anderson Kill Olick & Oshinsky

[57] ABSTRACT

An inventive method for producing an optical tape comprises the steps of sequentially depositing a label layer and a reflection layer on a substrate. The label layer and the reflection layer has a same reflexibility in a predetermined wavelength range of a laser beam, thereby providing a label image to a user as well as capability of information recording.

4 Claims, 5 Drawing Sheets

METHOD OF PRODUCING AN OPTICAL DISK HAVING AN INTEGRATED LABEL LAYER

FIELD OF THE INVENTION

The present invention relates to a method of producing an optical disk; and, more particularly, to a method of producing an optical disk having an integrated label layer deposited on the recording surface of a substrate.

DESCRIPTION OF THE PRIOR ART

In general, an optical disk offers a number of advantages over conventional magnetic tapes or disks in that they have the ability to store binary data at a high recording density and good reliability for an extended period of service time. Examples of such optical disk include a magneto-optical disk(MOD), a write-once read many memory (WORM), a read only memory(ROM) and a compact disk(CD), all being designed to store data/information in an optically readable condition.

Referring to FIG. 1, there is shown a prior art optical disk 1. The optical disk 1 is of an annular plate 1c having a through-hole 1a through which a spindle of a turntable (not shown) is inserted. The disk 1 has a front surface with a number of information recording grooves 1b and a back surface, opposite the front surface, on which a label 2 is attached by an adhesive.

However, the above optical disk has a disadvantage in that the disk may—albeit minutely—fluctuate when the label is eccentrically attached thereon, since the label carries a substantial weight as it is normally attached manually.

Further, a double-sided optical disk will have its information recording capacity decreased because of the consumption of the recording Surface by the label.

SUMMARY OF THE INVENTION

It is, therefore, an object of the present invention to provide a method of producing an optical recording medium with an integrated label layer capable of recording the necessary information while providing the label image to a user.

It is another object of the present invention to provide a method of producing an optical recording medium with an integrated label layer having superior structural integrity and scratch-resistance.

In accordance with one aspect of the present invention, there is provided a method of producing an optical recording medium comprising the steps of: machining a master having a recording surface; molding a Stamper on the master to have a facing surface corresponding to the recording surface and separating it from the master; preparing a substrate on the stamper to shape a number of recording grooves capable of storing data/information in anioptically readable condition by an injection molding and separating it from the stamper; depositing a label layer on a portion of the substrate in a desired pattern and a reflection layer on the remaining portion of the substrate; and depositing a transparent protective layer on the label layer and the reflection layer.

In accordance with another aspect of the present invention, there is provided a method of producing a double-sided optical recording medium, comprising the steps of: machining a master having a recording surface; molding a stamper on the master to have a facing surface corresponding to the recording surface and separating it from the master; preparing a pair of substrates on the stamper to shape a number of recording grooves capable of storing data/information in an optically readable condition by an injection molding and separating it from the stamper; depositing a label layer on a portion of each of the substrates in a desired pattern and a reflection layer on the remaining portion of the substrates; depositing a transparent protective layer on each of the label layers and the reflection layers; applying an adhesive on a lower surface of one of the substrates; and adhering said two substrates to each other, with said transparent layers having an opposing relationship.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 2A:
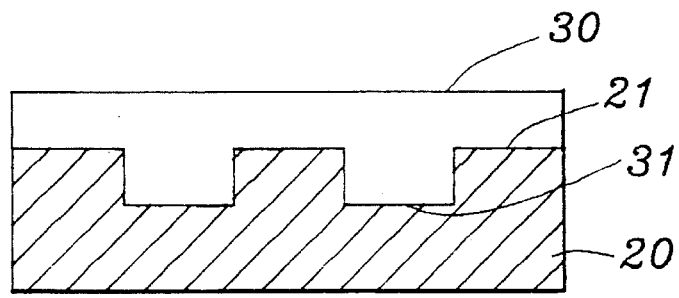
FIG. 2(A–D) shows one embodiment of the inventive method of producing an optical disk that has an integrated label layer deposited directly on the light incident surface of a transparent substrate.

Referring to FIGS. 2(A) to (2D), there is shown an embodiment of a method of producing an optical disk in accordance with the invention. As is well-known in the art, the optical disk is manufactured through a number of successive steps, e.g., a mastering step, a stamping step, a substrate preparation step, a film formation step, and a post-treatment step.

First, as shown in FIG. 2(A), a master 20 is machined to have a recording surface 21 identical to a substrate to be produced. Then, a stamper 30, having a facing surface 31 corresponding to the recording surface 21, is formed on the master 20 by an injection molding and separated from the master 20.

Figure 1:
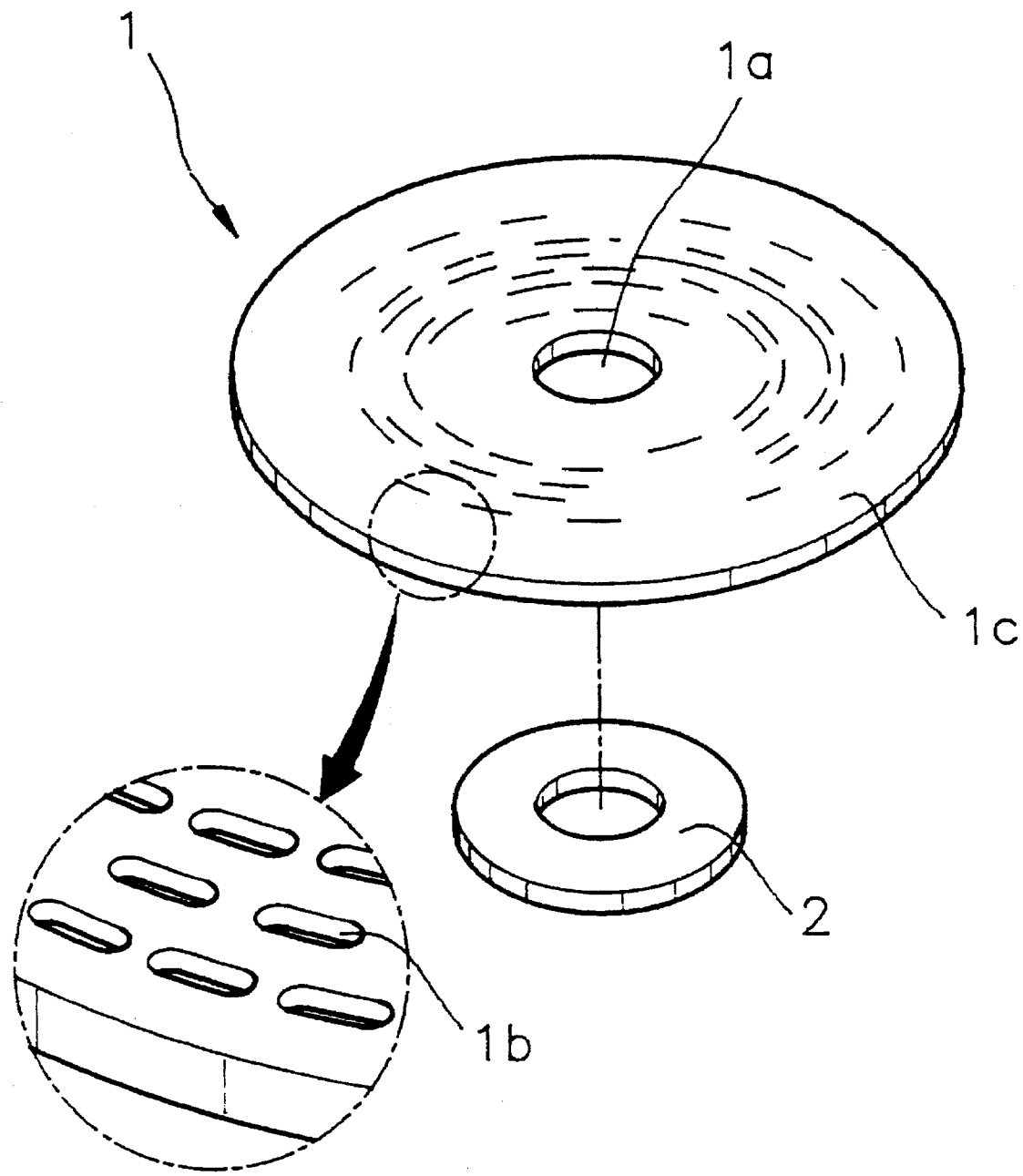
FIG. 1 is a partially enlarged perspective view showing a typical example of the prior art optical disk.
Figure 2B:
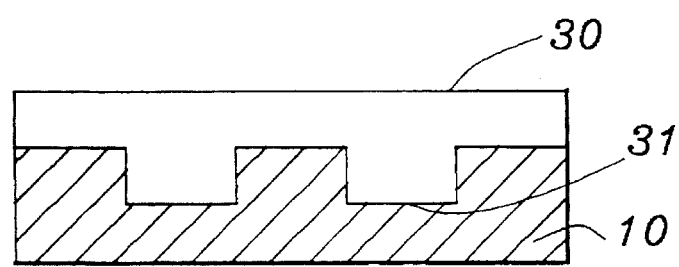

In the course of the substrate preparation step, as shown in FIG. 2(B), the stamper 30 is employed to shape a number of grooves 1b(see FIG. 1) capable of storing data/information in an optically readable condition on a substrate 10 by the injection molding; and, then, the substrate 10 is separated from the stamper 30.

Figure 2C:
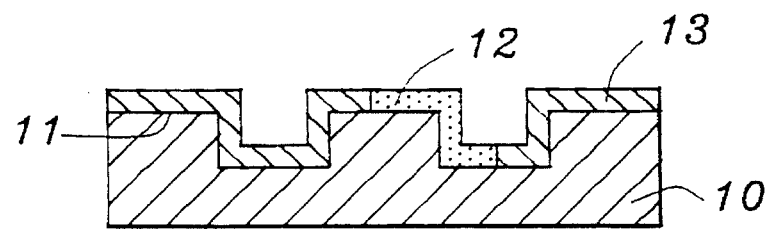

After the completion of the substrate preparation step, as shown in FIG. 2(C), a label layer 12 is deposited on a portion of the substrate 10 in a desired pattern by using a known technique, e.g., sputtering, silk screen or plasma polymerization. Then, a reflection layer 13 is deposited on the remaining portion of the substrate by using the same technique. The label layer 12 and the reflection layer 13 are preferably made of a material that has a same reflexibility with respect to a predetermined laser beam, e.g., gold(Au) and silver(Ag) in case of a laser beam of a wavelength 780 nm. Of course, other types of materials may be used to prepare the label layer and the reflection layer if they have the same reflexibility in a predetermined wavelength range.

Figure 2D:
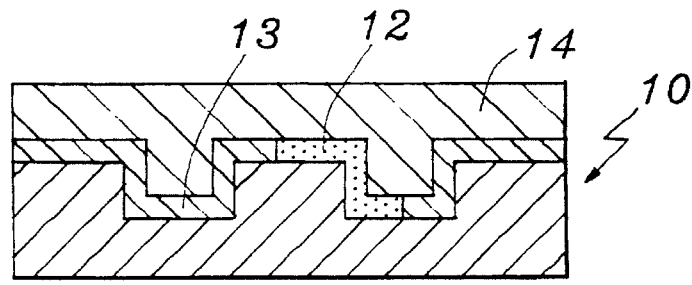

Deposited on the label layer 12 and the reflection layer 13 is a transparent protective layer 14 as shown in FIG. 2(D). This layer 14 may be molded through the use of a stamper obtained from a known mastering step. The layer 14 may be made of such a transparent resin as polymethyl methacrylate, amorphous olefin, polycarbonate, epoxy and the like. Preferably, the reflection layer 14 should have a high light transmittance and increased scratch-resistance.

FIGS. 3(A) to 3(E) illustrate a modified embodiment of the method of producing the optical disk in accordance with the present invention. This modification differs from the method shown in FIGS. 2(A) to 2(D) in that a pair of substrates 100 are formed to have an individual recording surface by using the same technique as the above.

Figure 3A:
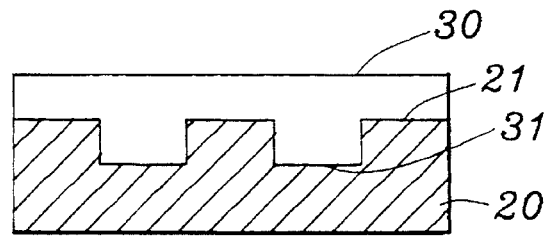
FIG. 3(A–E) is a view similar to FIG. 2 but showing a modified embodiment of the inventive method of producing an optical disk having an integrated label layer at its both sides.
Figure 3B:
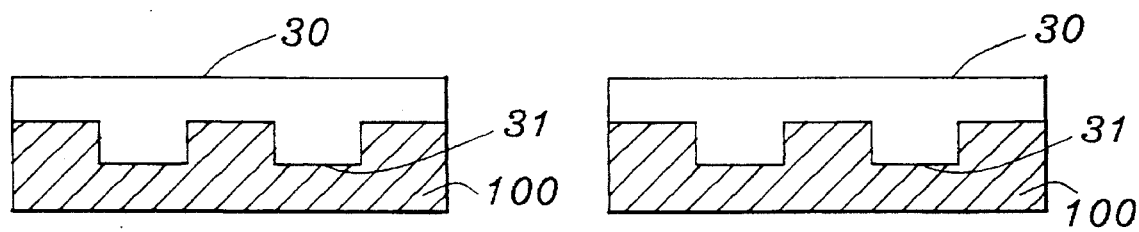
Figure 3C:
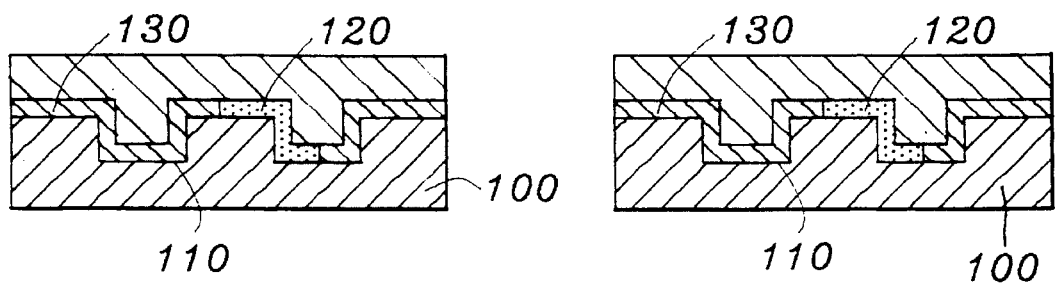
Figure 3D:
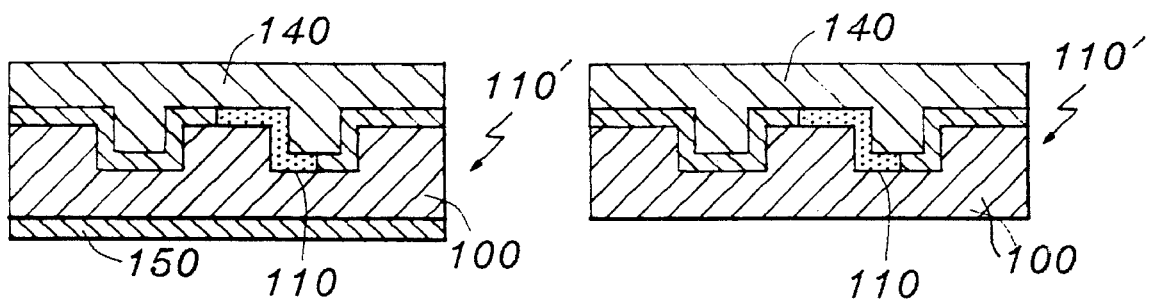
Figure 3E:
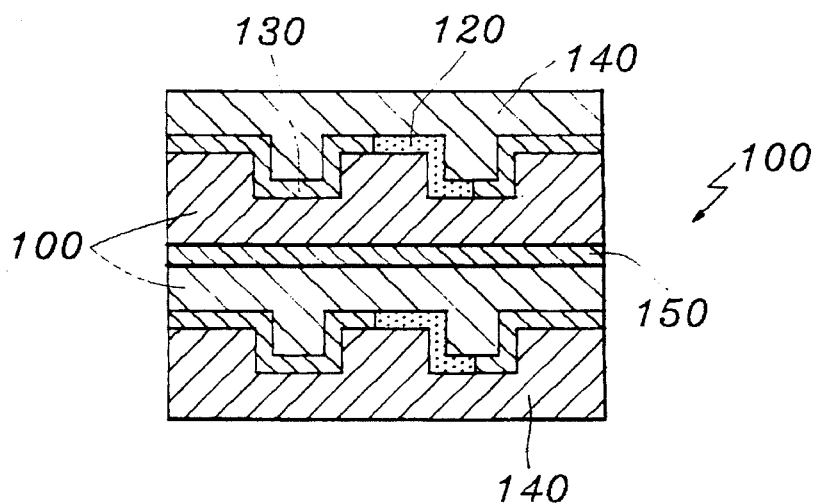
Figure 4:
FIG. 4 is a plan view illustrating an exemplary product of the inventive optical disk.

After the completion of the individual disk production steps, an adhesive layer 150 is applied to a lower surface of one of the substrates 100 as shown in FIG. 3(D), then, two finished disks 110' are adhered to each other, with their respective transparent layers 140 having an opposite relationship, thereby completing the production of a double-sided optical disk 100' as shown in FIGS. 3(E) and 4.

Although the invention has been shown and described with respect to the preferred embodiments, it will be understood by those skilled in the art that certain changes and modifications may be made without departing from the spirit and scope of the invention as defined in the following claims.

What is claimed is:

1. A method of producing an optical recording medium, capable of allowing a label image to be formed on the optical recording medium during the manufacturing thereof, the method comprising the steps of:

(a) preparing a recording surface on a master;

(b) forming a facing surface ion a stamper by molding the stamper onto the master, wherein the facing surface corresponds to the recording surface;

(c) separating the stamper with the facing surface from the master;

(d) providing a plurality of recording grooves on a surface of a substrate capable of storing data/information in an optically readable condition using the facing surface of the stamper;

(e) separating the substrate from the stamper;

(f) depositing a label layer on a portion of the surface of the substrate with the plurality of recording grooves in a desired pattern and a reflection layer on the remaining portion of the surface of the substrate with the plurality of the recording grooves; and (g) depositing a transparent protective layer on the label layer and the reflection layer to thereby form said optical recording medium, having the label image formed thereon, wherein the label and the reflection layers are made of materials having a same reflexibility in a wavelength range of a laser beam used in recording the data/information on the optical recording medium.

2. The method as recited in claim 1, wherein the label and the reflection layers are made of gold and silver, respectively.

3. A method of producing a double-sided optical recording medium, capable of allowing a label image to be formed on the double-sided optical recording medium during the manufacturing thereof, the method comprising the steps of:

(a) preparing a recording surface on a master;

(b) forming a facing surface On a stamper by molding the stamper onto the master, wherein the facing surface corresponds to the recording surface;

(c) separating the stamper with the facing surface from the master;

(d) providing a plurality of recording grooves on a surface of a first substrate capable of storing data/information in an optically readable condition using the facing surface of the stamper;

(e) separating the first substrate from the stamper;

(f) depositing a label layer on a portion of the surface of the first substrate with the plurality of recording grooves in a desired pattern and a reflection layer on the remaining portion of the surface of the first substrate with the plurality of grooves;

(g) depositing a transparent protective layer on the label layer and the reflection layer, recording medium, having the label image formed thereon, wherein the label and the reflection layers are made of materials having a same reflexibility in a wavelength range of a laser beam used in recording the data/information on said double-sided optical recording medium;

(h) preparing a second substrate according to said steps (a) to (g) above;

(i) applying an adhesive on a lower surface of the first and the second substrates opposite the surface with the plurality of the recording grooves; and (j) adhering the first and the second substrates together, with the lower surface of each of the substrates facing each other to thereby form said double-sided optical medium having the label image formed thereon.

4. The method as recited in claim 3, wherein the label and the reflection layers are made of gold and silver, respectively.

* * * * *